United States Patent
Mitchler

(10) Patent No.: US 10,368,174 B2
(45) Date of Patent: Jul. 30, 2019

(54) DISTRIBUTED PHASE LOCKED LOOP IN HEARING INSTRUMENTS

(71) Applicant: SEMICONDUCTOR COMPONENTS INDUSTRIES, LLC, Phoenix, AZ (US)

(72) Inventor: Dennis Wayne Mitchler, Marin-Epagnier (CH)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 221 days.

(21) Appl. No.: 15/194,803

(22) Filed: Jun. 28, 2016

(65) Prior Publication Data

US 2017/0373824 A1    Dec. 28, 2017

(51) Int. Cl.
*H04L 7/04* (2006.01)
*H04R 25/00* (2006.01)
*H04L 7/00* (2006.01)
*H04L 7/033* (2006.01)
*H04B 1/16* (2006.01)
*H04R 5/033* (2006.01)

(52) U.S. Cl.
CPC ......... *H04R 25/505* (2013.01); *H04L 7/0012* (2013.01); *H04L 7/033* (2013.01); *H04R 25/554* (2013.01); *H04B 1/16* (2013.01); *H04R 5/033* (2013.01); *H04R 2420/07* (2013.01)

(58) Field of Classification Search
CPC ... H04L 7/0012; H04L 7/0016; H04L 7/0331; H04L 7/0079; H04R 25/505; H04R 25/554; H04R 2420/07

USPC ....... 375/316, 354, 355, 356, 360, 373, 375, 375/376

See application file for complete search history.

(56) References Cited

U.S. PATENT DOCUMENTS

| | | | |
|---|---|---|---|
| 5,821,789 A * | 10/1998 | Lee | H03L 7/107 327/148 |
| 8,730,402 B2 * | 5/2014 | Kim | H04N 5/455 348/572 |
| 8,929,467 B1 * | 1/2015 | Xiu | H04L 25/4902 375/220 |
| 9,130,577 B2 * | 9/2015 | Sahara | H03L 7/08 |
| 9,143,316 B1 * | 9/2015 | Novellini | H04L 7/0331 |
| 2006/0078079 A1 * | 4/2006 | Lu | H03L 7/087 375/376 |
| 2007/0046382 A1 * | 3/2007 | Meltzer | H03L 7/0891 331/16 |
| 2007/0053462 A1 * | 3/2007 | Pirooz | H04L 27/2675 375/285 |
| 2008/0008281 A1 | 1/2008 | Abrol et al. | |
| 2009/0298420 A1 | 12/2009 | Haartsen et al. | |
| 2010/0330932 A1 * | 12/2010 | Cowley | H03J 1/0083 455/77 |
| 2011/0158264 A1 | 6/2011 | Philips et al. | |

(Continued)

*Primary Examiner* — Siu M Lee
(74) *Attorney, Agent, or Firm* — Dickinson Wright PLLC

(57) ABSTRACT

A system, in some embodiments, comprises: an antenna; a receiver, coupled to the antenna, to receive wireless signals from another electronic device; a signal processor (SP) coupled to the receiver; and a phase locked loop (PLL), distributed among the receiver and the SP, to synchronize the frequency of a data sampling clock used by the SP with the frequency of a source clock determined by the receiver.

11 Claims, 5 Drawing Sheets

(56) References Cited

U.S. PATENT DOCUMENTS

| | | | |
|---|---|---|---|
| 2012/0177234 A1* | 7/2012 | Rank | G10L 19/04 |
| | | | 381/314 |
| 2012/0213265 A1* | 8/2012 | Wu | H03L 7/0807 |
| | | | 375/226 |
| 2012/0268178 A1* | 10/2012 | Reddy | H03F 3/45179 |
| | | | 327/157 |
| 2014/0143582 A1* | 5/2014 | Kindred | G06F 1/12 |
| | | | 713/400 |
| 2015/0214960 A1* | 7/2015 | Kim | H03L 7/081 |
| | | | 327/150 |

* cited by examiner

DISTRIBUTED PHASE LOCKED LOOP IN HEARING INSTRUMENTS

BACKGROUND

Hearing instruments, such as hearing aids, earbuds, headphones and speakers, are often designed to receive wireless signals from other electronic devices. For example, hearing aids may wirelessly receive audio signals from televisions to improve the viewing experience for the hearing-impaired. Similarly, earbuds may wirelessly communicate with a mobile phone to stream music files stored on the phone.

Such hearing instruments include data sampling clocks that dictate the frequency with which the hearing instruments sample the wirelessly-transmitted audio signals. A common problem is that such data sampling clocks are not synchronized with the audio clock (or "source clock") of the electronic device with which the hearing instrument is communicating. For example, a source clock generated by a mobile phone may not match a sampling clock that a hearing aid uses to sample music being wirelessly streamed from the mobile phone. This typically results in latency problems, and efforts to correct such asynchronous clocks result in unacceptably significant power consumption and space requirements.

SUMMARY

At least some of the embodiments disclosed herein are directed to a system, comprising: an antenna; a receiver, coupled to the antenna, to receive wireless signals from another electronic device; a signal processor (SP) coupled to the receiver; and a phase locked loop (PLL), distributed among the receiver and the SP, to synchronize the frequency of a data sampling clock used by the SP with the frequency of a source clock determined by the receiver. One or more of these embodiments may be supplemented with one or more of the following concepts, in any order and in any combination: wherein the system is a hearing instrument selected from the group consisting of: a wireless hearing aid; a wireless earbud; a wireless headset; and a wireless speaker; wherein said receiver comprises a radio; wherein the receiver is to receive wireless signals from another electronic device selected from the group consisting of: a mobile phone; a tablet; a personal computer; a stereo system; and a television; wherein the source clock is received from said another electronic device; wherein the SP uses the data sampling clock to sample audio signals received from said another electronic device; wherein the receiver is a radio that includes a phase detector of the PLL; wherein the receiver further includes a loop filter of the PLL; wherein the SP comprises a digitally controlled oscillator (DCO) of the PLL; wherein the SP further includes a loop filter of the PLL; wherein the SP includes a clock divider of the PLL; wherein the PLL comprises: a phase detector to determine a phase difference between the source clock and the data sampling clock and to produce an error signal indicating said difference; a loop filter, coupled to the phase detector, to filter said error signal; a digitally controlled oscillator (DCO), coupled to the loop filter, to produce a system clock for the SP based at least in part on said filtered signal; and a clock divider, coupled to the DCO, to divide the system clock to produce the data sampling clock; wherein the system clock has a higher frequency than the data sampling clock.

At least some embodiments are directed to a hearing instrument, comprising: an antenna; a radio, coupled to the antenna, to receive a source clock from another electronic device in wireless communication with said radio, said radio comprising a phase detector of a phase locked loop (PLL); a signal processor (SP), coupled to the radio via a communication interface, to process signals using a system clock and to sample audio signals received from said another electronic device using a data sampling clock, said SP comprising a digitally-controlled oscillator (DCO) and a clock divider of the PLL; and a loop filter of the PLL positioned within the radio or the SP, wherein the phase detector is adapted to produce an error signal indicating a difference between the source clock and the data sampling clock, the loop filter is adapted to filter said error signal, the DCO is adapted to produce the system clock using the filtered signal, and the clock divider is adapted to produce the data sampling clock using the system clock. One or more of these embodiments may be supplemented using the following concept: wherein the hearing instrument is selected from the group consisting of: a hearing aid; an earbud; a headset; and a speaker.

At least some embodiments are directed to a method, comprising: obtaining a radio that comprises a phase detector; obtaining a signal processor (SP) that comprises a digitally-controlled oscillator (DCO) and a clock divider; providing a hearing instrument that includes the radio and the SP, at least one of the radio or the SP including a loop filter; and configuring the phase detector, the loop filter, the DCO and the clock divider to synchronize a data sampling clock of the SP with a source clock of the radio. One or more of these embodiments may be supplemented using one or more of the following concepts, in any order and in any combination: wherein said phase detector is capable of producing an error signal that indicates a difference between the data sampling clock and the source clock; wherein said loop filter is capable of filtering said error signal to produce a filtered signal; wherein said DCO is capable of producing a system clock for use by the SP based on the filtered signal; wherein said clock divider is capable of generating the data sampling clock using the system clock, said data sampling clock used to sample audio signals received via said radio.

Figure 1:
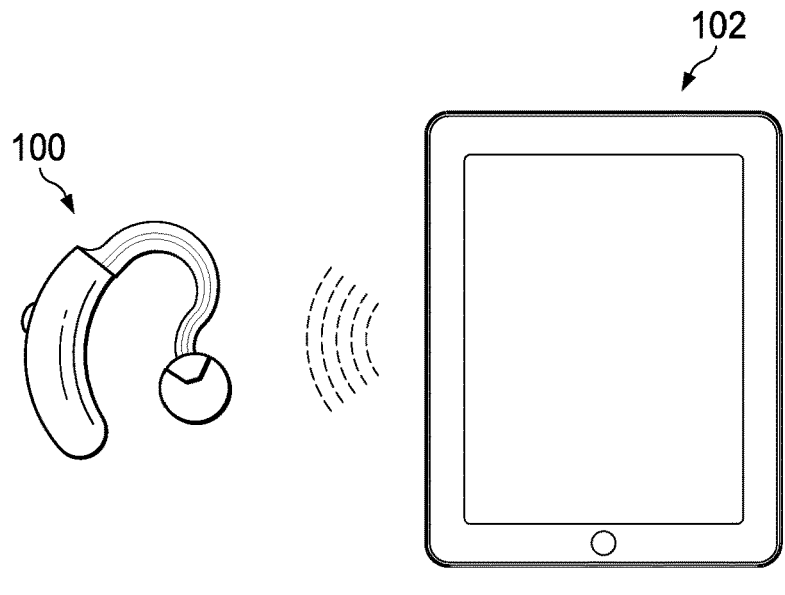
FIG. 1 depicts a hearing instrument wirelessly communicating with an electronic device.

The specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

The term "couple" and variants thereof, as used herein, indicate a direct or indirect connection.

DETAILED DESCRIPTION

Disclosed herein are various embodiments in which a phase locked loop (PLL) is distributed across multiple components of a hearing instrument. In illustrative embodiments, parts of a PLL are included in a radio of a hearing instrument and other parts of the PLL are included in a digital signal processor (DSP) of the hearing instrument. The precise distribution of PLL components among these parts of the hearing instrument may vary, as may the actual parts of the hearing instrument that contain one or more components of a PLL. Regardless of the specific PLL distribution implemented, the distributed PLL is used to synchronize the data sampling clock of the hearing instrument with the source clock wirelessly received from another electronic device (e.g., from a television set or mobile phone streaming audio signals to the hearing instrument). By synchronizing these clocks using a distributed PLL as described herein, problems common to such hearing instruments—such as excessive latency, power consumption and space requirements—are mitigated.

FIG. 1 depicts a hearing instrument 100 wirelessly communicating with an electronic device 102. The hearing instrument 100 may be any suitable type of audio device, such as and without limitation, a hearing aid, an earbud, a headphone, a speaker, and the like. The electronic device 102 may be any suitable type of device, such as a mobile phone, a tablet, a personal computer, a stereo system, a television, and the like. The hearing instrument 100 and the electronic device 102 are equipped to wirelessly communicate with each other—for instance, using radio frequencies. Various types of signals may be transmitted between the hearing instrument 100 and the electronic device 102. For example, in some embodiments, the electronic device 102 may be a television that displays a video on its screen and that wirelessly transmits the accompanying audio signals to the hearing instrument 100. The hearing instrument 100, in turn, provides a processed version of the audio signals to a user.

The scope of this disclosure is not limited to hearing instruments. In some embodiments, the instrument 100 may be a different type of device that receives video signals in addition to or instead of audio signals. In such embodiments, the electronic device 102 transmits video signals (and, possibly, accompanying audio signals) to the instrument 100. In general, this disclosure and the embodiments described herein apply to all types of wireless communication. The systems and methods now described may be implemented in the hearing instrument 100.

Figure 2:
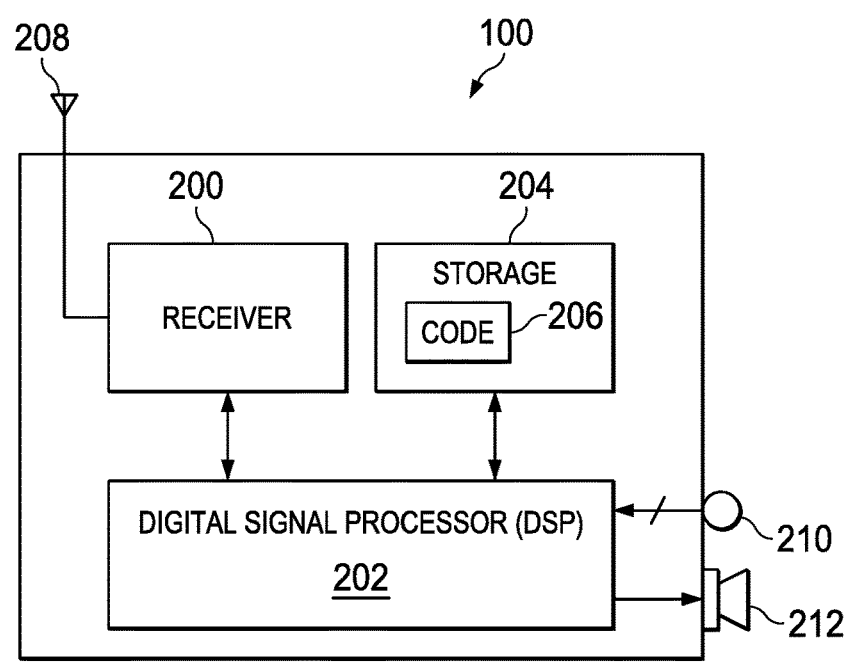
FIG. 2 is a block diagram of a hearing instrument with wireless communication capabilities.

FIG. 2 is a block diagram of the hearing instrument 100. The hearing instrument 100 comprises a receiver 200 (e.g., a radio); a digital signal processor (DSP) 202 coupled to the receiver 200; storage 204 (e.g., an electrically-erasable, programmable, read-only memory (EEPROM)), coupled to the DSP 202, that includes executable code 206 (e.g., software and/or firmware); an antenna 208 coupled to the receiver 200; one or more inputs 210 (e.g., microphone(s)) coupled to the DSP 202; and an output 212 (e.g., a speaker) coupled to the DSP 202. Generally, the actions attributed herein to the DSP 202 are performed by executing code—for instance and without limitation, the code 206 stored in storage 204. Similarly, the receiver 200 may contain a microprocessor or communicate with a microprocessor to enable it to perform one or more of its functions as described herein. Although the electronic device 102 of FIG. 1 is not described in detail in this disclosure, it, too, contains a processor that executes code to facilitate the performance of one or more of its functions as described herein. The embodiments disclosed herein are generally described as including a DSP, although in each of these embodiments, a general signal processor may be used instead.

In operation, the receiver 200 receives wireless signals (e.g., audio signals) from the electronic device 102 (FIG. 1) via the antenna 208. These signals may be transmitted at any suitable frequency—for instance and without limitation, at a rate of 16 kHz. The frequency of data transmission from the electronic device 102 to the hearing instrument 100 is termed the "source clock." The DSP 202 receives the signals from the receiver 200 and processes them for output via the output 212. To accomplish this task, the DSP 202 uses a clock, called a "data sampling clock," to sample the signals received from the electronic device 102 via the receiver 200. (The DSP 202 has one or more other clocks, such as a system clock, used to perform other functions.) The data sampling clock may be set as desired so that only some—or, preferably, all—of the data samples from the receiver 200 are sampled. To avoid latency problems and undesirable audio artifacts, and to ensure that all data samples from the receiver 200 are sampled, the data sampling clock and the source clock should be synchronized. Stated another way, the frequencies of these clocks should be matched as closely as possible or at least beyond a predetermined, suitable threshold.

The remainder of this disclosure describes techniques for synchronizing these clocks. These techniques entail the use of a PLL that is distributed across multiple components of the hearing instrument 100. The distributed PLL presents several advantages. The embodiments described may use one or more components that may already be present on the receiver 200 and/or the DSP 202 when such devices are purchased from their respective manufacturers, thereby reducing costs and saving the space that would have otherwise been required to incorporate additional components into the hearing instrument 100. Hearing instrument DSPs often do not contain all of the hardware necessary to implement a PLL, but distributing the PLL leverages the components that hearing instrument DSPs typically do contain. In addition, implementing the PLL on the hearing instrument means that it is not necessary to implement the PLL on the electronic device 102, and so a high-frequency, phase-locked signal does not need to be wirelessly transmitted to the hearing instrument 100. This mitigates unnecessary power consumption. Further, the fact that a PLL is used at all facilitates synchronization and thus mitigates latency. Thus, the distributed PLL provides a confluence of benefits that other systems fail to provide.

Figure 3:
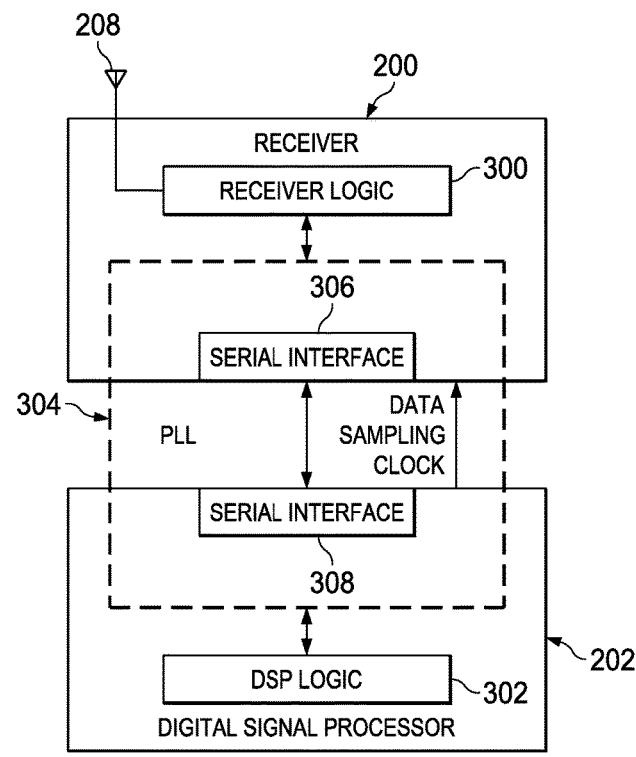
FIG. 3 is a block diagram of a phase locked loop (PLL) distributed between a receiver and a digital signal processor (DSP) of a hearing instrument.

FIG. 3 depicts an illustrative PLL distribution scheme. As shown, a PLL 304 is distributed across the receiver 200 and the DSP 202. The components of the PLL 304 are intentionally omitted from FIG. 3 to emphasize that different parts of the PLL 304 may be distributed across the receiver 200 and DSP 202 in different ways. Any and all suitable distribution schemes are contemplated. The receiver 200 comprises receiver logic 300, which may generally be described as any hardware, software and/or firmware that the receiver 200 uses to perform one or more of its functions. Similarly, the DSP 202 comprises DSP logic 302, which may generally be described as any hardware, software and/or firmware that the DSP 202 uses to perform one or more of its functions. The receiver 200 and DSP 202 may communicate with each other in various ways, and in at least some embodiments, such communication includes the use of a serial link via serial interfaces 306 and 308. Although not strictly part of a traditional PLL, serial interfaces 306 and 308 are shown as being part of the PLL 304 to the extent that the distributed portions of the PLL need a way to communicate with each other. Alternatively, parallel interfaces may be used. Serial interfaces, parallel interfaces, and other suitable interfaces may generally be referred to as "communication interfaces" herein. Further, the DSP 202 provides the receiver 200 with the aforementioned data sampling clock, which is used by the PLL 304 as described below.

Figure 4:
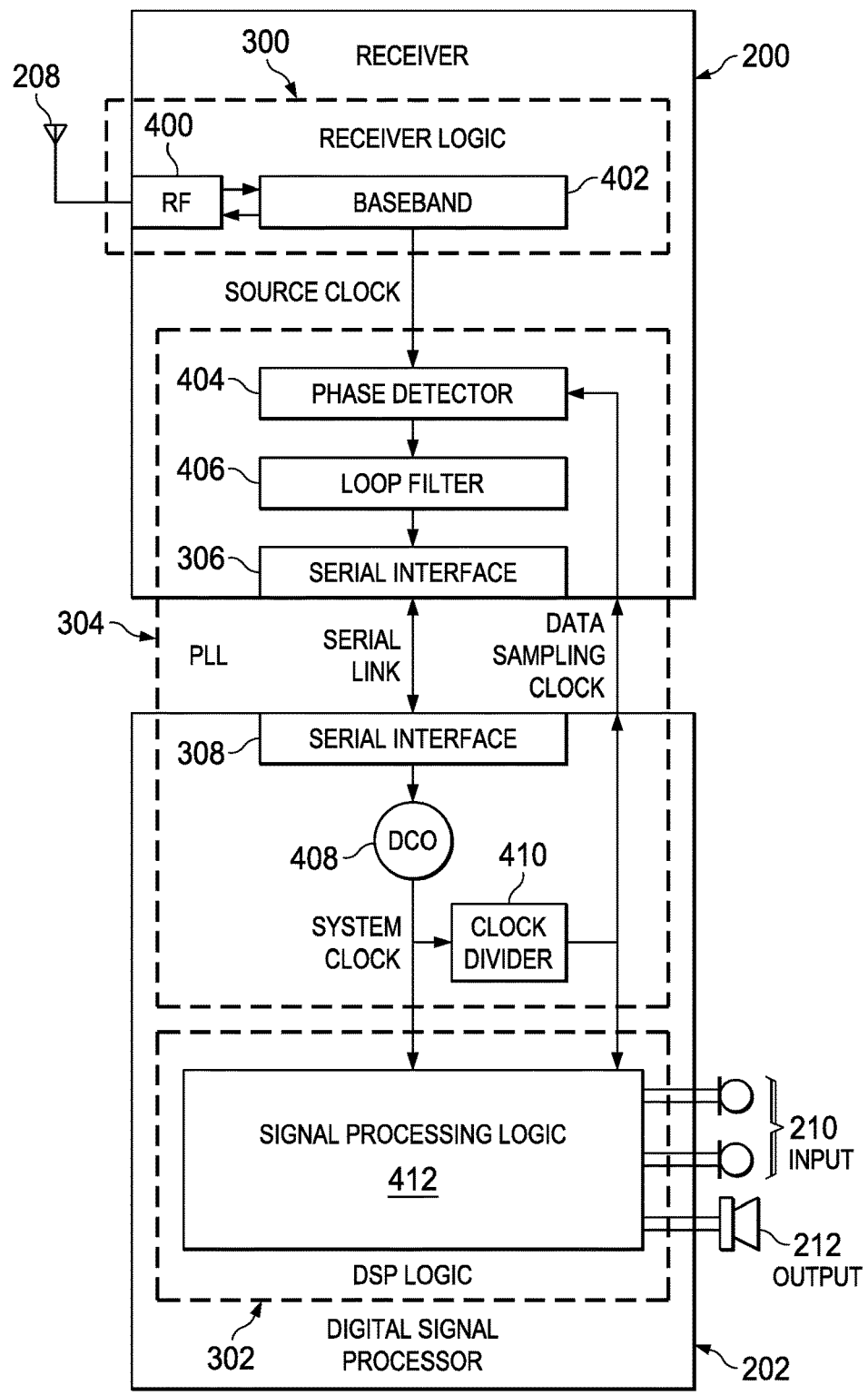
FIGS. 4 and 5 are detailed block diagrams of PLLs distributed between receivers and DSPs of hearing instruments.

FIG. 4 depicts an illustrative distribution of the PLL 304 across the receiver 200 and DSP 202 of the hearing instrument 100. The receiver 200 (e.g., a radio) may include a radio frequency transceiver (RFT) 400 coupled to a baseband processor 402. The portion of the PLL 304 that is located in the receiver 200 includes a phase detector 404 and a loop filter 406. The portion of the PLL 304 positioned on the DSP 202 includes a digitally-controlled oscillator (DCO) 408 and a clock divider 410. The DSP 202 further comprises signal processing logic 412, one or more inputs 210 and output 212. Not all parts of the receiver 200 and DSP 202 are depicted in FIG. 4. For example, the receiver 200 and DSP 202 may contain additional components and connections to process received audio signals for output to the human ear.

In operation, the PLL 304 seeks to match the phases—and, thus, the frequencies—of the source and data sampling clocks. An antenna 208 receives wireless signals (e.g., from the electronic device 102 of FIG. 1) and provides these signals to the RFT 400 and baseband processor 402 for demodulation and processing. The baseband processor 402 produces the source clock based on the frequency with which data is received at the receiver 200. In at least some embodiments, the source clock frequency is identical to the frequency with which data is received at the receiver 200. The phase detector 404 receives the source clock from the baseband processor 402 and compares it against the data sampling clock received from the DSP 202. (As previously explained, the data sampling clock frequency is the rate at which the DSP 202 samples data received via the receiver 200.) The phase detector 404 determines the phase difference between the two clocks and produces an error signal as an output.

The error signal is provided to the loop filter 406. This may be, for instance, a low-pass filter that has a suitably-selected cutoff frequency (e.g., 1 kHz) based on any number of factors considered by the design engineer. The filtered signal is provided to the DCO 408 via the serial link. The DCO 408 outputs an oscillating signal whose frequency is controlled by an input signal—specifically, by the filtered signal received from the loop filter 406. The output of the DCO 408 is the system clock that is used by the signal processing logic 412 to perform its various functions (e.g., receiving and processing input signals via the input(s) 210 for subsequent output via output 212). The clock divider 410 divides down the system clock to produce the data sampling clock. The data sampling clock is provided to the signal processing logic 412 and to the phase detector 404 in a feedback loop.

Figure 5:
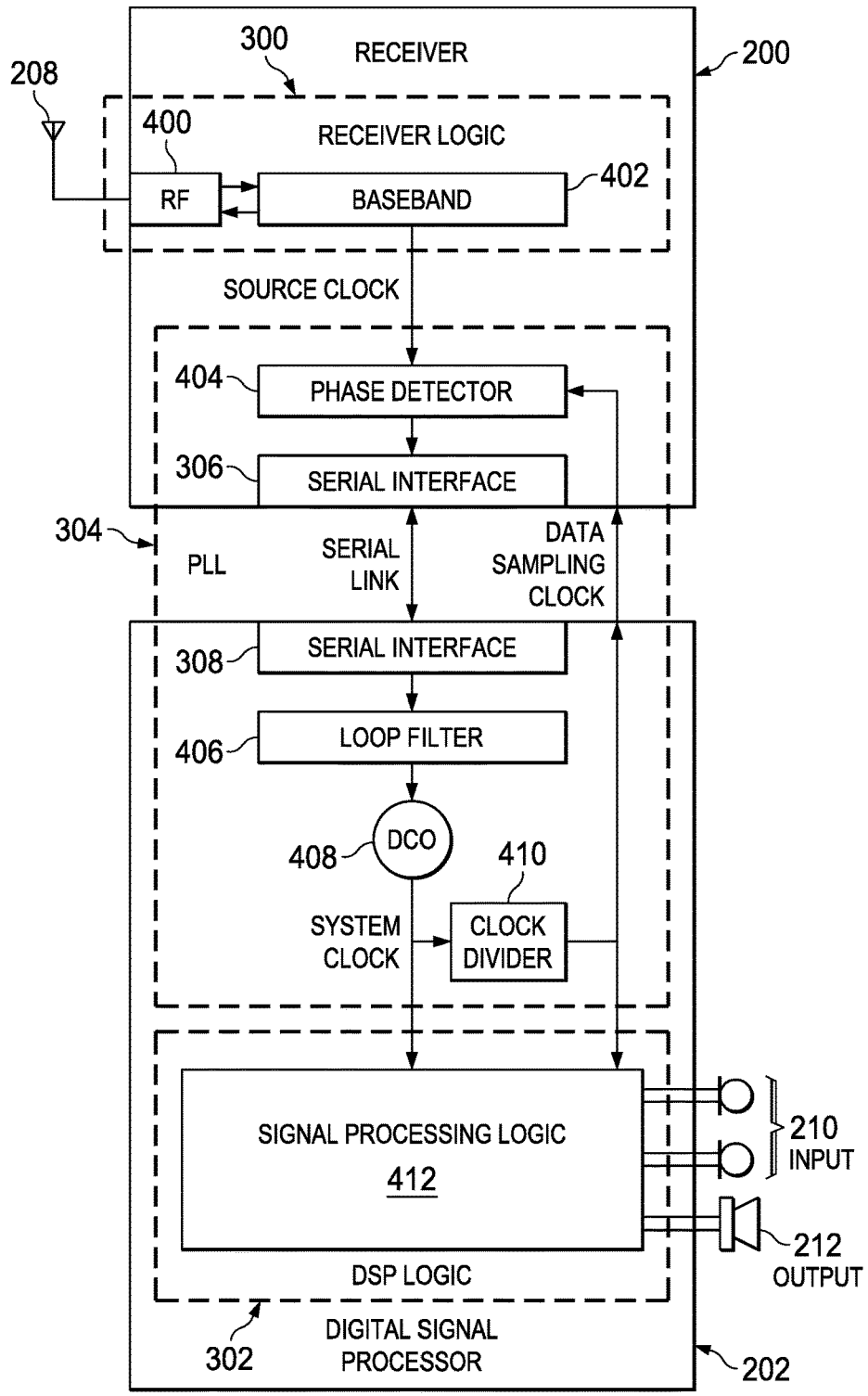

In at least some embodiments, the system clock is faster than the data sampling clock, since the system clock must maintain high frequency for use by, e.g., analog-to-digital converter(s) in the signal processing logic 412. The data sampling clock frequency need not be kept as high as the system clock; the phase detector 404 will force the data sampling clock to match the source clock, because it is desirable to keep the source clock frequency low to mitigate excessive power consumption. In some embodiments, the system clock is in the range of 2-20 MHz, inclusive. In some embodiments, the data sampling clock is in the range of 8-32 kHz, inclusive. Likewise, in some embodiments, the source clock is in the range of 8-32 kHz. The frequencies of the data sampling and source clocks will be similar or identical due to the PLL 304; however, the precise values for these frequencies may vary depending on the application. FIG. 5 depicts another PLL distribution scheme. The system of FIG. 5 is identical to that of FIG. 4 with the exception of the loop filter 406, which is relocated to the DSP 202. The scope of disclosure is not limited to the two distribution schemes shown in FIGS. 4 and 5. Any and all variations of these and other distribution schemes are contemplated and included in the scope of this disclosure.

One or more components of the PLL 304 may be implemented in hardware, software, firmware, or some combination thereof. For instance, the phase detector may be implemented using a processor executing firmware that causes the processor to determine the phase offset between the source and data sampling clocks by counting the number of cycles of the data sampling clock that elapse in one period of the source clock.

Figure 6:
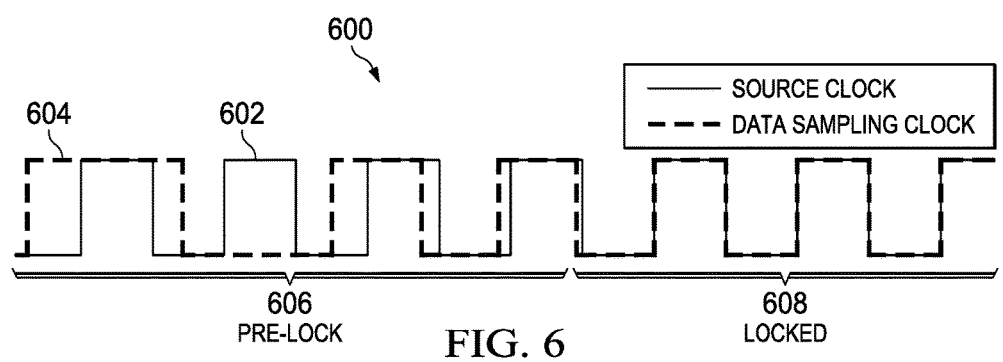
FIG. 6 is a graph demonstrating the synchronization of a source clock and a data sampling clock using a distributed PLL.

FIG. 6 illustrates the action of the PLL 304. It shows a graph 600 with two pulse waves—a source clock pulse wave 602 and a data sampling clock pulse wave 604. In the pre-lock region 606, the frequencies and phases of the two waveforms are mismatched. Over time, the PLL 304 brings the phases—and, thus, the frequencies—of the two waveforms into alignment until they are locked in region 608. By maintaining this lock, the PLL 304 mitigates the aforementioned latency problems. The locking process shown in FIG. 6 is simplified for brevity. In practice, the locking process may require additional time.

Figure 7:
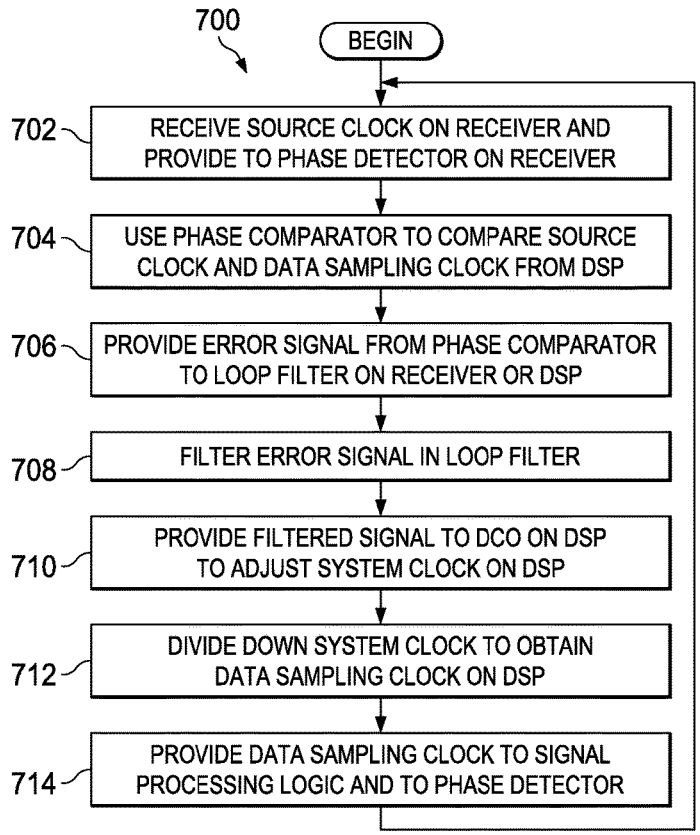
FIG. 7 is a flow diagram of a method for using a hearing instrument comprising a distributed PLL.

FIG. 7 is a flow diagram of a method 700 for using an illustrative hearing instrument comprising a distributed PLL. The method 700 begins with receiving the source clock on the receiver and providing it to the phase detector, which is on the receiver (step 702). The method 700 next comprises using the phase comparator to compare the source and data sampling clocks (step 704). The method 700 subsequently includes providing an error signal from the phase comparator to the loop filter, which is located on the receiver or DSP (step 706). The method 700 also includes filtering the error signal in the loop filter (step 708) and providing the filtered signal to the DCO on the DSP to adjust the system clock on the DSP (step 710). The method 700 further comprises dividing down the system clock to obtain the data sampling clock on the DSP (step 712). Finally, the method 700 includes providing the data sampling clock to the signal processing logic and to the phase detector (step 714). The method 700 may be modified as suitable to add, delete, modify or rearrange one or more steps.

Figure 8:
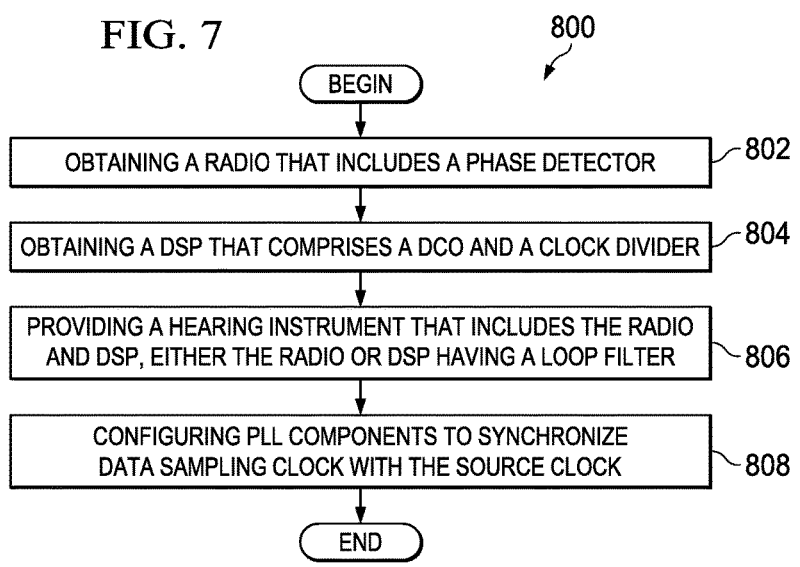
FIG. 8 is a flow diagram of a method for producing a hearing instrument comprising a distributed PLL.

FIG. 8 is a flow diagram of a method 800 for producing an illustrative hearing instrument comprising a distributed PLL. The method 800 comprises obtaining a radio that includes a phase detector (step 802). This obtaining step includes either manufacturing the radio, purchasing a radio that already includes the phase detector, or modifying a purchased radio to include the phase detector. Next, the method 800 comprises obtaining a DSP that includes a DCO and a clock divider (step 804). In this step, the DSP may be manufactured, purchased with the DCO and clock divider, or purchased and modified to include the DCO and clock divider. The radio and DSP are then incorporated into a hearing instrument, and the loop filter is included on either the radio or the DSP (step 806). Finally, the method 800 comprises configuring the various components of the PLL (e.g., by coupling the PLL components to each other, by programming the appropriate software and/or firmware) to synchronize the data sampling and source clocks as described in detail above and as depicted in the accompanying drawings. The method 800 may be modified as suitable to add, delete, modify or rearrange one or more steps.

Numerous other variations and modifications will become apparent to those skilled in the art once the above disclosure is fully appreciated. It is intended that the following claims be interpreted to embrace all such variations, modifications and equivalents.

What is claimed is:

1. A system, comprising:
    a receiver configured to receive wireless signals from an electronic device, the receiver comprising:
        receiver logic operable to receive an input signal at a source clock frequency from the electronic device;
        a phase detector coupled to the receiver logic and operable to:
            receive a data sampling clock; and
            compute an error signal indicating a difference between the data sampling clock and the source clock; and
        a first communication interface coupled to the phase detector and operable to transmit the input signal; and
    a signal processor (SP) coupled to the receiver and comprising:
        a second communication interface operable to couple to the first communication interface to communicatively couple the SP to the receiver;
        a digitally-controlled oscillator (DCO) coupled to the second communication interface and operable to generate a system clock;
        a clock divider coupled to the DCO and the phase detector and operable to generate the data sampling clock based at least partially on the system clock; and
        digital signal processing logic coupled to the DCO and the clock divider and operable to process the input signal at a frequency specified by the data sampling clock.

2. The system of claim 1, wherein said receiver comprises a radio.

3. The system of claim 1, wherein the receiver is configured to receive wireless signals from an electronic device selected from the group consisting of: a mobile phone; a tablet; a personal computer; a stereo system; and a television.

4. The system of claim 1, wherein the system clock has a higher frequency than the data sampling clock.

5. The system of claim 1, further comprising a loop filter coupled between the phase detector and the first communication interface, wherein the loop filter is operable to generate a filtered signal, and wherein the DCO generates an oscillating signal based at least partially on the filtered signal as the system clock.

6. The system of claim 1, further comprising a loop filter coupled between the second communication interface and the DCO, wherein the loop filter is operable to generate a filtered signal, and wherein the DCO generates an oscillating signal based at least partially on the filtered signal as the system clock.

7. The system of claim 1, wherein the communication interface is selected from the group consisting of a serial interface and a parallel interface.

8. A signal processor, comprising:
    a communication interface operable to receive an input signal from a receiver;
    a digitally-controlled oscillator (DCO) coupled to the communication interface and operable to generate a system clock;
    a clock divider coupled to the DCO and a phase detector of the receiver and operable to:
        generate a data sampling clock based at least partially on the system clock; and
        provide the data sampling clock to the receiver coupled to the signal processor; and
    digital signal processing logic coupled to the DCO and the clock divider and operable to process the input signal at a frequency specified by the data sampling clock.

9. The signal processor of claim 8, further comprising a loop filter coupled between the communication interface and the DCO, wherein the loop filter is operable to generate a filtered signal.

10. The signal processor of claim 8, wherein the communication interface is selected from the group consisting of a serial interface and a parallel interface.

11. The signal processor of claim 8, wherein the DCO is operable to generate the system clock at least partially based on the input signal, and wherein the input signal is based at least partially on the data sampling clock.

* * * * *